United States Patent
Pfau et al.

(10) Patent No.: US 7,032,771 B2
(45) Date of Patent: Apr. 25, 2006

(54) BOTTOM SIDE RAIL STRUCTURE FOR A TANK CONTAINER

(75) Inventors: Dieter Pfau, Weitefeld (DE); Ulrich Bernhardt, Nenndorf (DE)

(73) Assignee: WEW Westerwalder Eisenwerk GmbH, Weitefeld (DE)

( * ) Notice: Subject to any disclaimer, the term of this patent is extended or adjusted under 35 U.S.C. 154(b) by 382 days.

(21) Appl. No.: 10/334,951

(22) Filed: Dec. 31, 2002

(65) Prior Publication Data
US 2004/0007580 A1 Jan. 15, 2004

(30) Foreign Application Priority Data
Jul. 15, 2002 (DE) .................... 202 11 594 U

(51) Int. Cl.
*B65D 8/04* (2006.01)

(52) U.S. Cl. .................... 220/685
(58) Field of Classification Search ............ 220/636, 220/638, 685; 206/386
See application file for complete search history.

(56) References Cited

U.S. PATENT DOCUMENTS

| | | | |
|---|---|---|---|
| 1,848,191 A | 3/1932 | Neely | |
| 2,758,776 A | * 8/1956 | Tevander | 206/386 |
| 3,912,103 A | 10/1975 | Gerhard | |
| 4,838,418 A | * 6/1989 | Teixeira | 206/386 |
| 4,875,595 A | * 10/1989 | Van Valkenburg | 220/1.5 |
| 4,982,859 A | * 1/1991 | Colebrook | 108/57.16 |
| 5,205,428 A | * 4/1993 | Yurgevich et al. | 220/1.5 |
| 6,041,958 A | * 3/2000 | Tremelo | 220/4.28 |

FOREIGN PATENT DOCUMENTS

| | | |
|---|---|---|
| DE | 69 29 841 U1 | 7/1969 |
| DE | 41 00 010 A1 | 7/1992 |
| EP | 0 733 511 A2 | 9/1996 |

* cited by examiner

*Primary Examiner*—Kien Nguyen
(74) *Attorney, Agent, or Firm*—Blakely, Sokoloff, Taylor & Zafman; Stephen M. De Klerk

(57) ABSTRACT

Tank container with a bottom side rail unit (25) composed of longitudinal beams (18), connected with one another by a shell element (23). These longitudinal beams make the bottom side rail unit (25) extremely light, flat and at the same time deflection resistant, and prevent unwanted vertical strain from acting on the container (1). The bottom side rail unit (25) integrates the tank (1) as a supporting element via a suitable insulation (26, 26a) and is, in combination with the shell element (23), part of the insulating cover (27).

9 Claims, 3 Drawing Sheets

BOTTOM SIDE RAIL STRUCTURE FOR A TANK CONTAINER

CROSS-REFERENCE TO RELATED APPLICATIONS

The present patent application claims priority from German Patent Application No. DE 202 11 594.1, filed on Jul. 15, 2002.

A variety of moving loads occurs when transporting, storing and handling tank containers. Tank containers consist of a frame and a container, laid out and connected in such a way that they can durably bear these moving loads. The frame and the container absorb the external stress the container corners endure. The load transmission between the frame and the container usually occurs via a ring saddle mounting, such as described in DE 32 12 696 C2, for example. Such mountings can be laid out extremely tough and reduce the weight when the moving loads occur only at the front frame and in particular at the container corners.

However, stress can also occur in the area between the front sides. This stress is mainly vertical stress working upwards and occurs on street vehicles during transportation. A load occurs when the tank container props itself up against the main support of the vehicle in the so-called "Intermediate Load Transfer Areas".

Another type of stress occurs when tank containers are used as roller containers. In this case, loading and unloading of the tank container takes place by rolling the container over longitudinal beams acting as rolling profiles using a hook lift system. Considerable vertical lumped loads moving upward work on the profiles.

The common frontal mounting is inadequate for these types of stress. The known solutions consist of extremely rigid bottom side rails absorbing the stress without using the loading capacity of the container, or by connecting the tank bottom area and the bottom profiles with appropriate metallic mountings propping up against the container whereby the container itself carries part of the load.

The known solutions have serious disadvantages for insulated tank containers. For example, the usable volume of the container, which is already reduced by the insulating coat, is additionally reduced when the bottom side rails have to run completely outside the insulating coat. When the bottom side rails are connected with the tank, the insulation needs to be interrupted in the joint areas. This causes additional thermal bridges influencing the insulating capacity and increasing the production cost and the tare considerably.

The purpose of the present invention is to equip a tank container with a light and production-friendly bottom side rail structure capable of picking up corresponding loads without reducing the insulation and the volume of the tank.

Claim 1 describes the purpose of this invention. The installation of a rigid connection between the longitudinal beams and a shell creates a stabilized bottom side rail with a considerably increased bending flexural strength against vertical stress, in spite of the flat construction. According to claim 2, this structural component becomes extremely stable when it is in one piece or welded. When using the preferred construction described in claim 3, the shell itself already shows an increased dimensional stability.

The designs described in claims 4 and 5 concern the use of the longitudinal beams as roll-off profiles for tank containers designed as roller containers.

The additional designs described in claims 6 through 10 cover insulated tank containers with shells serving at the same time as an insulating coat (claims 7 and 8), and tanks able to pick up vertical loads thanks to the installation of a load transfer area in an appropriate insulating material in the insulation coat (claims 9 and 10).

The drawings illustrate a preferred design of the invention. In these drawings.

Figure 1:
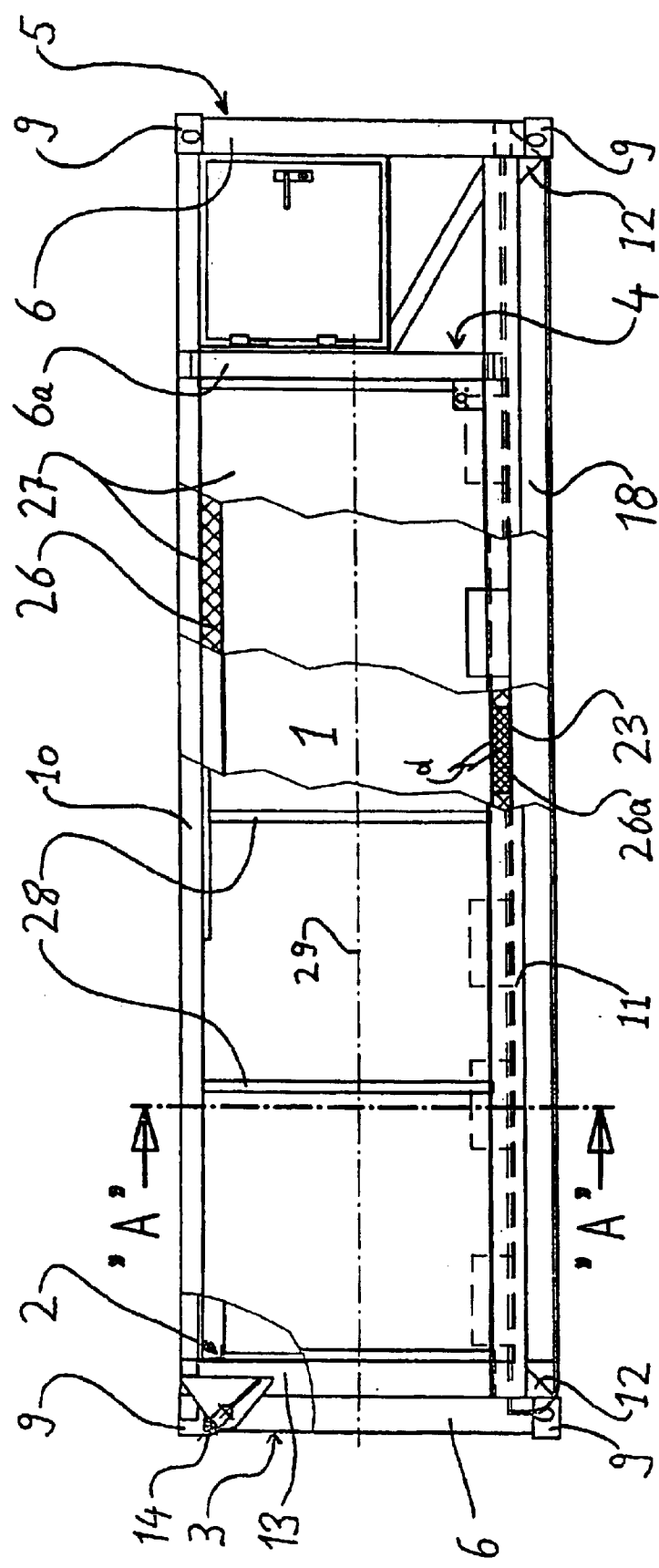
FIG. 1 shows a side view and cutouts of the tank container.
Figure 2:
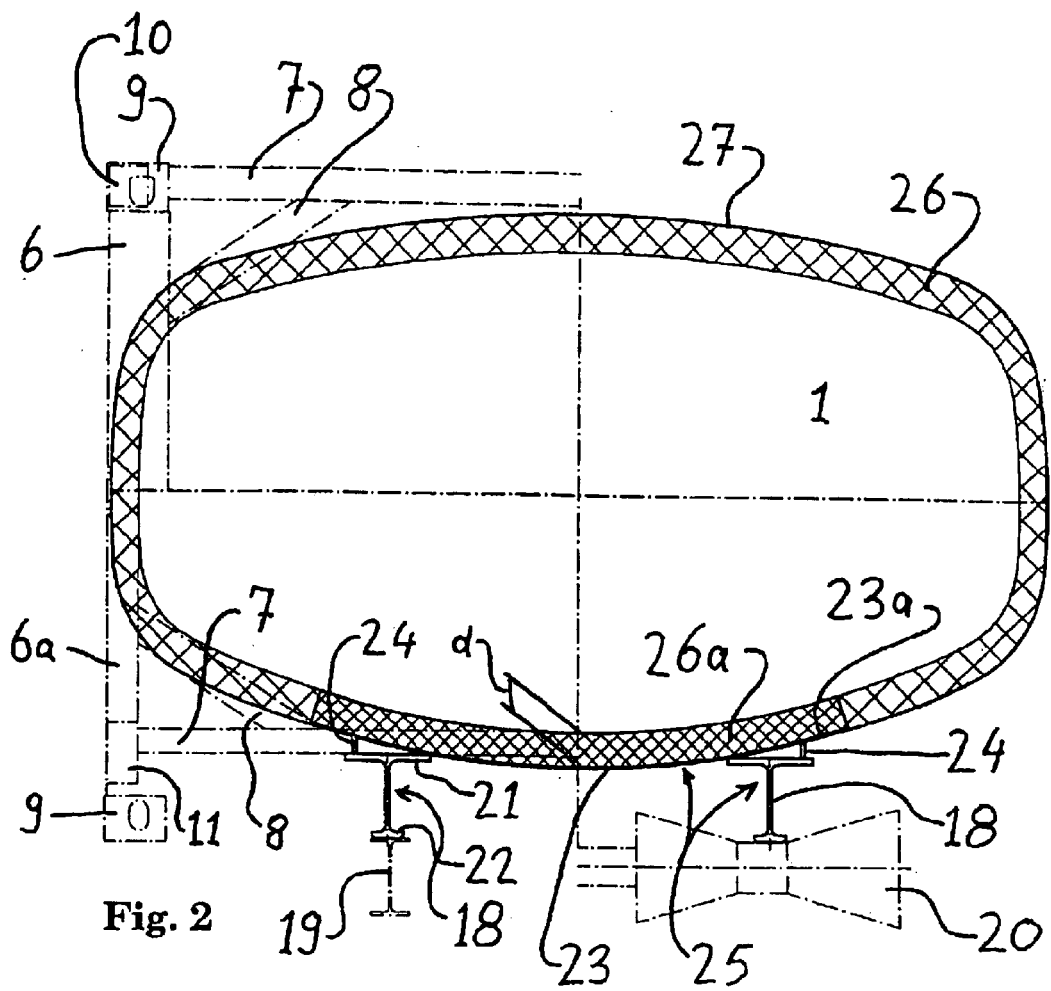
FIG. 2 shows section "A"—"A" of FIG. 1, in which vehicle parts and some frame parts marked with semicolons.

Referring to FIGS. 1 to 4, a tank container consists of a trunk-shaped tank 1, connected with a front mounting 2 to two front frames 3, 4. The frontal sub-frame 4 and another end front frame 5 define an area suitable for units such as pumps, water treatment equipment, energy supply, spare parts, etc. All front frames 3, 4, 5 have corner posts 6 or exterior frame stretchers 6a and crosspieces 7, in which the front frames 3, 4 carrying the tank 1 additionally show diagonal frame stretchers 8 welded to the front mountings 2. Additionally, each exterior front frame 3, 5 is equipped with four container corners9 enabling the transport and handling of the tank container. Two upper longitudinal capping pieces 10 connect the upper container corners 9, and two lower longitudinal capping pieces 11 run directly over the container corners 9 between the container corner posts 6 of the front frames 3, 5. In order to improve the power transmission, junction pieces 12 connect the front frames 3, 5 with the container corners 9.

The forward front frame 3 (looking in the direction of motion), contains two interior frame stretchers 13, which are also welded to the front mounting 2.

A hoop 15, which is a part of a hook lift 16 on a vehicle 17, picks up another hook 14 between these interior frame stretchers 13.

The container is also equipped with two additional longitudinal beams 18 located in the bottom area, running parallel with one another towards the tank axle 29 between the front frames 3, 5. The distance between the longitudinal beams 18 and their profiles has been determined to make them compatible with a hook lift system. The corresponding dimensions in the design example have been selected to make them compatible with a hook lift system according to DIN 30722. During transport, both longitudinal beams 18 rest on appropriate chassis beams 19 of the vehicle 17.

When unloading the container from the vehicle 17, the hook 15 lifts the container over the hoop 14 and pushes it with the hook lift 16 over conveyor rolls 20 until the rear front frame 3 ends up behind the rear side of the vehicle. There, the hook lift picks it up and puts it down on the floor. When the container is rolled off, the longitudinal beams 18 move over on the conveyor rolls 20, which create vertical power components on the longitudinal beams 18. This vertical power components depend on the position of the container on the vehicle 17. In order to lead the longitudinal beams 18, the conveyor rolls 20 are biconical.

Figure 3:
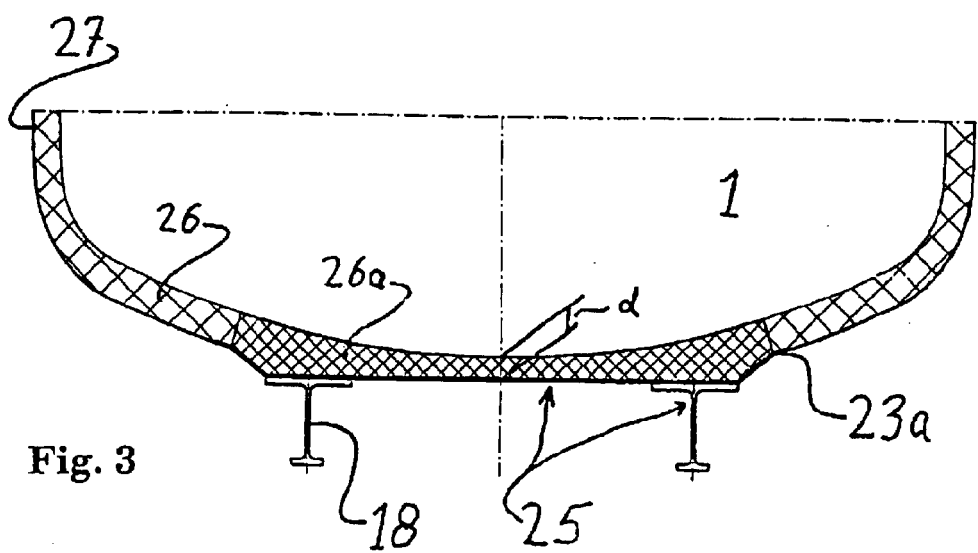
FIG. 3 is a partial view of section "A"—"A" of FIG. 1 with an alternative shell design without frame and vehicle parts.
Figure 4:
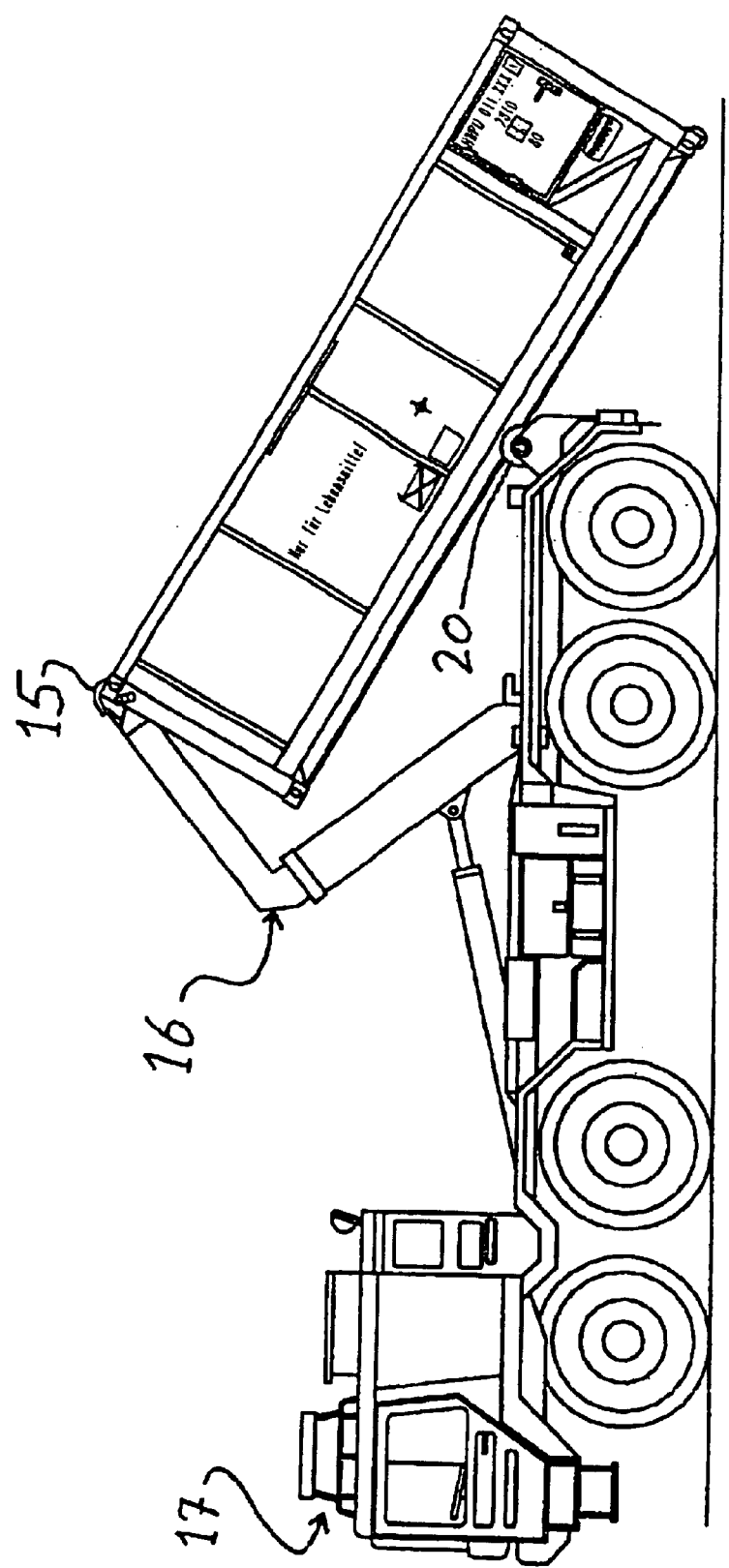
FIG. 4 shows a diagrammatic view of the loading/unloading process of the tank container together with a corresponding vehicle.

Loading and unloading creates a deflectional strain on the longitudinal beams 18. Under these circumstances, the upper belt 21 of the longitudinal beam 18 is exposed to tensile strain and the lower belt 22 to compressive strain. The longitudinal beam shown presents a profile similar to a double T; other suitable profiles for picking up this type of loads are T-, C-, U or rectangular tube profiles. The tank 1 area is equipped with a shell element 23 situated between the longitudinal beams 18. This shell is welded to the longitudinal beams 18 at the facing ends of the upper belt 21 and over two support beams 24, which are also connected with the upper belt. This enables the longitudinal beams 18, the support beam 24 and the shell elements 23 to create a stable, flat and deflection resistant bottom side rail unit 25 which is excellent for absorbing the deflection occurring during loading and unloading. In this case, the shell element 23 can not only be in a concentric position towards the tank deflection of the cylinder shell form shown in FIG. 2, but also in a prismatic position whereby the angle of the edge runs parallel with the tank axle 29 (FIG. 3). In another design, which is not shown here, the shell element 23 and longitudinal beams 18 come in one piece of sheet metal.

The tank 1 is connected with front mountings 2 to the front frames 3, 4, and is placed at a distance d over the shell element 23. The distance d is determined in a way that the deflection of the bottom side rail unit 25 is smaller than distance d during loading and unloading. This keeps tank 1 from being exposed to inappropriate stresses during loading and unloading. It also allows the tank 1 to have with the lowest possible wall thickness. The wall thickness is only determined by the appropriate interior pressure load or other factors, which have nothing to do with the vertical strain to which the tank container is exposed during use.

The tank container is insulated with insulation 26, 26*a* between the shell element 23 and the tank 1, thus completely enclosing the container. An insulating cover 27 attached with flank pieces 23*a* encompasses the insulation. Furthermore, tightening straps 28 press the insulating cover against the container. The flank pieces 23*a* go into the insulating cover 27 change in a tangential way. The actual insulation 26, 26*a* can be made of any suitable insulation materials such as mineral wool, PUR foam, etc.

The insulation area 26*a* is located exactly between the shell element 23 and the tank 1, and consists of compression-proof insulation material taken up by the bottom side rail unit 25. This compression-proof insulation distributes the the pressure over the tank during transportation, storage, and especially during loading and unloading of the containers. This weight distribution also enables the tank 1 to serve as a support without changing shape. PUR and PIR materials with a compressive resistance of at least 0.2 N/mm$^2$ are especially suitable for the insulation area. Other materials such as wood, cork or plastic materials are also suitable.

Besides the trunk-shaped cross section shown, the tank 1 can also have an oval, cylindrical or other appropriate cross section. In case the mounting area provided for the additional units would not be needed, the tank can also extend between the outer front frames 3, 5 without the frontal sub-frame 4. The invention is also beneficial for tank containers using bottom side rail units 25 able to pick up vertical loads in standardized load transfer areas ("Intermediate Load Transfer Areas" in accordance with ISO 1496-3) instead of a conveyor roll system.

What is claimed is:

1. Tank container with a tank (1) and a framework picking up the tank (1) over front frames (3, 4, 5), whereby the framework is equipped with lower longitudinal beams (18), characterized by a framework with a shell element (23) connecting the lower longitudinal beams (18) in a rigid way, whereby the shell element (23) is curved in a concentric position towards the tank deflection between the longitudinal beams and/or bent in a prismatic shape, wherein the edges run parallel with the tank axis (29).

2. Tank container in accordance with claim 1, whereby the longitudinal beams (18) and shell element (23) are welded in one piece together.

3. Tank container in accordance with claim 1, whereby the longitudinal beams (18) are styled as roll-off profiles.

4. Tank container in accordance with claim 1, whereby the longitudinal beams (18) are shaped in a U-, C-, T-, double T- or rectangular tube profile.

5. Tank container in accordance with claim 1, whereby the tank container is equipped with an insulation (26, 26*a*) and an insulating cover (27), and the shell element (23) is part of the insulating cover (27).

6. Tank container in accordance with claim 5, whereby the shell element (23) is equipped with flank pieces (23*a*) entering the insulating cover (27) in a tangential way.

7. Tank container in accordance with claim 5, whereby the insulating cover (27) is attached to the shell element (23, 23*a*).

8. Tank container in accordance with claim 5, whereby an insulation area (26*a*) running between the tank (1) and the shell element (23) is laid out in a way that the vertical strain between the shell element and the tank are transmitted without plastic deformation of the tank.

9. Tank container in accordance with claim 8, whereby the insulation area (26*a*) is made of an appropriate compression-proof insulating material, preferably PUR/PIR, or even better PUR/PIR with a compressive resistance of at least 0.2 N/mm$^2$.

* * * * *